United States Patent
Jang

(10) Patent No.: US 11,231,282 B2
(45) Date of Patent: *Jan. 25, 2022

(54) METHOD AND APPARATUS FOR PROVIDING NODE-BASED MAP MATCHING

(71) Applicant: HERE GLOBAL B.V., Eindhoven (NL)

(72) Inventor: Dongwook Jang, Lisle, IL (US)

(73) Assignee: HERE Global B.V., Eindhoven (NL)

( * ) Notice: Subject to any disclaimer, the term of this patent is extended or adjusted under 35 U.S.C. 154(b) by 327 days.

This patent is subject to a terminal disclaimer.

(21) Appl. No.: 16/265,626

(22) Filed: Feb. 1, 2019

(65) Prior Publication Data

US 2019/0162543 A1 May 30, 2019

Related U.S. Application Data

(63) Continuation of application No. 15/618,954, filed on Jun. 9, 2017, now Pat. No. 10,209,083.

(51) Int. Cl.
*G01C 21/30* (2006.01)
*G01C 21/32* (2006.01)

(52) U.S. Cl.
CPC ............. *G01C 21/30* (2013.01); *G01C 21/32* (2013.01)

(58) Field of Classification Search
CPC .................................. G01C 21/30; G01C 21/32
See application file for complete search history.

(56) References Cited

U.S. PATENT DOCUMENTS

| 6,909,398 | B2 | 6/2005 | Knockeart et al. |
| 8,718,932 | B1 | 5/2014 | Pack et al. |
| 10,209,083 | B2 * | 2/2019 | Jang ........................ G01C 21/30 |
| 2005/0198286 | A1 | 9/2005 | Xu et al. |
| 2008/0294331 | A1 * | 11/2008 | Fushiki ............ G08G 1/096827 701/119 |
| 2008/0319645 | A1 | 12/2008 | Kumagai et al. |
| 2012/0259547 | A1 | 10/2012 | Morlock et al. |

(Continued)

OTHER PUBLICATIONS

Liu et al., "Calibrating Large Scale Vehicle Trajectory Data", 2012 IEE 13th International Conference on Mobile Data Management, Jul. 23, 2012, pp. 222-231.

(Continued)

*Primary Examiner* — Hussein Elchanti
(74) *Attorney, Agent, or Firm* — Ditthavong, Steiner & Mlotkowski

(57) ABSTRACT

An approach is provided for node-based map matching. The approach involves processing probe data to sort a plurality of probe points according to sessions keys. The approach also involves selecting a subset of the plurality of probe points within a threshold distance of a node of a map representation of a transportation network. The approach further involves initiating a map matching of the probe points of each session key to the map representation by, for said each session key: (1) determining a closest probe point to the node; (2) determining another closest probe point to a neighboring node, wherein the neighboring node is connected to the node by at least one link; and (3) projecting the plurality of probe points between the closest probe point to the node and the another closest probe point to the neighboring node onto the link.

20 Claims, 13 Drawing Sheets

(56) References Cited

U.S. PATENT DOCUMENTS

| | | |
|---|---|---|
| 2015/0179064 A1 | 6/2015 | Hiruta et al. |
| 2017/0032667 A1 | 2/2017 | Fowe et al. |
| 2017/0146355 A1 | 5/2017 | Xu |
| 2017/0323028 A1* | 11/2017 | Jonker ................ G06F 16/9024 |

OTHER PUBLICATIONS

Li et al., "On Efficient Map-matching According to Intersections You Pass by", 24th International Conference, DEXA 2013, Prague, Czech Republic, Aug. 26-29, 2013. Proceedings, Part II, pp. 1-15.

* cited by examiner

METHOD AND APPARATUS FOR PROVIDING NODE-BASED MAP MATCHING

RELATED APPLICATION

This application is a continuation of U.S. patent application Ser. No. 15/618,954 (now U.S. Pat. No. 10,209,083), filed Jun. 9, 2017, entitled "Method and Apparatus for Providing Node-Based Map Matching," which is incorporated herein by reference in its entirety.

BACKGROUND

Traditionally, map-matchers (e.g., point-based map matchers) are used to process the probe points to identify the correct road or path on which a probe device or vehicle is traveling, and to determine the device's location on that road or path. However, current map-matchers can often encounter issues of accuracy, scalability, and/or efficiency, particularly when processing high volumes of probe points (e.g., millions of probe points). Therefore, service providers face significant technical challenges to improve map matching speed and reduce computational resources used for map matching of probe data.

Some Example Embodiments

Therefore, there is a need for a node-based map matching of probe that reduces computational resource requirements when compared to traditional point-based map matchers.

According to one embodiment, a computer-implemented method for map-matching probe data comprises processing the probe data to sort a plurality of probe points of the probe data into one or more location traces. The method also comprises selecting a subset of the plurality of probe points within a threshold distance of a node of a map representation of a transportation network. The method further comprises initiating a map matching of each location trace of the one or more location traces to the map representation by, for said each location trace: (1) determining a closest probe point to the node; (2) determining another closest probe point to a neighboring node, wherein the neighboring node is connected to the node by at least one link; and (3) projecting the plurality of probe points between the closest probe point to the node and the another closest probe point to the neighboring node onto the link to map match the plurality of probe points to the link.

According to another embodiment, an apparatus for map-matching probe data comprises at least one processor, and at least one memory including computer program code for one or more computer programs, the at least one memory and the computer program code configured to, with the at least one processor, cause, at least in part, the apparatus to process the probe data to sort a plurality of probe points of the probe data into one or more location traces. The apparatus is also caused to select a subset of the plurality of probe points within a threshold distance of a node of a map representation of a transportation network. The apparatus is further caused to initiate a map matching of each location trace of the one or more location traces to the map representation by, for said each location trace: (1) determining a closest probe point to the node; (2) determining another closest probe point to a neighboring node, wherein the neighboring node is connected to the node by at least one link; and (3) projecting the plurality of probe points between the closest probe point to the node and the another closest probe point to the neighboring node onto the link to map match the plurality of probe points to the link.

According to another embodiment, a computer-readable storage medium for map matching probe data carries one or more sequences of one or more instructions which, when executed by one or more processors, cause, at least in part, an apparatus to process the probe data to sort a plurality of probe points of the probe data into one or more location traces. The apparatus is also caused to select a subset of the plurality of probe points within a threshold distance of a node of a map representation of a transportation network. The apparatus is further caused to initiate a map matching of each location trace of the one or more location traces to the map representation by, for said each location trace: (1) determining a closest probe point to the node; (2) determining another closest probe point to a neighboring node, wherein the neighboring node is connected to the node by at least one link; and (3) projecting the plurality of probe points between the closest probe point to the node and the another closest probe point to the neighboring node onto the link to map match the plurality of probe points to the link.

According to another embodiment, an apparatus for map matching probe data comprises means for processing the probe data to sort a plurality of probe points of the probe data into one or more location traces. The apparatus also comprises means for selecting a subset of the plurality of probe points within a threshold distance of a node of a map representation of a transportation network. The apparatus further comprises means for initiating a map matching of each location trace of the one or more location traces to the map representation by, for said each location trace: (1) determining a closest probe point to the node; (2) determining another closest probe point to a neighboring node, wherein the neighboring node is connected to the node by at least one link; and (3) projecting the plurality of probe points between the closest probe point to the node and the another closest probe point to the neighboring node onto the link to map match the plurality of probe points to the link.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing node-based map matching are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
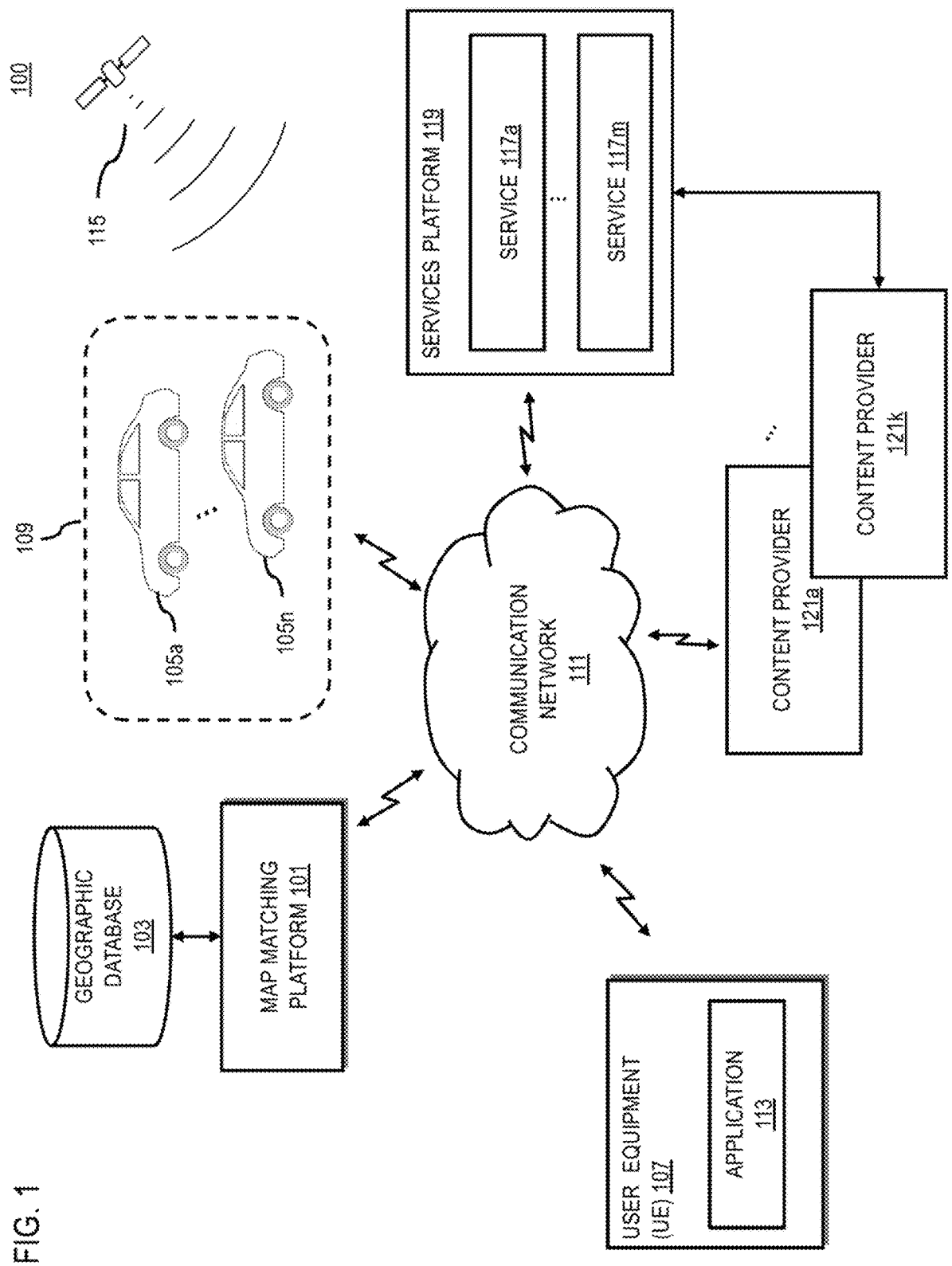
FIG. 1 is a diagram of a system capable of providing node-based map matching, according to one embodiment.

FIG. 1 is a diagram of a system capable of providing node-based map matching, according to one embodiment. Analysis of probe data consisting of location sensor data (e.g., Global Positioning Satellite (GPS) data and other satellite-based location data) often forms the basis for many mapping and navigation related services. For example, probe data analytics generally is based on having probe points (e.g., collected location points of probes traveling within a road network or other geographic area) matched to digital map data to figure out where those probes are on the road network. This analysis can then be used, for instance, to determine traffic patterns, etc. for using in providing mapping and navigation services. To perform this map matching, map matchers can process raw location data (e.g., probe data comprising probe points of GPS or other location data) to identify the road, path, link, etc. on which a probe device (e.g., a vehicle, navigation device, mobile device, smartphone, etc.) is travelling, and to determine the location of the probe device on that identified road segment, link, etc.

Although map matchers have been used widely, the map matching problem is still a challenge for the map making industry because map matching large amounts of unsorted probe data in bulk currently takes significant computation time and resources, and can be expensive. Generally, there are two types of traditional map matchers: (1) point-based map matchers, and (2) trajectory-based map matchers. For example, a point-based map matchers takes an individual GPS or probe point to match to the road segment or link based on, for instance, a maximum likelihood. On the other hand, a trajectory-based map matcher can produce more accurate results by taking more information in the form of a sequence of GPS or probe points (e.g., instead of a single probe point) and using a more complicated approach to map match the trajectory to a road segment. However, trajectory-based map matchers typically require a sequence of probe points to be captured over a period of time to create a trajectory for matching. Compared with a trajectory-based map matcher, a point-based map matcher is fast, easy to implement and does not need a large amount of memory. Therefore, point-based map matchers are more advantageous than trajectory-based map matchers for bulk data processing.

However, traditional point-based map matchers nonetheless remain expensive and time consuming, with trajectory-based map matchers even more resource intensive. For example, in one use case of developing a traffic pattern service or product, the service may require 3 years of probe data to be matched for the entire world to build the product. Using either traditional point-based map matching or trajectory-based map matching would require would require a very significant amount of data processing, thereby leading to significant resource consumption and expenses for the underlying computing infrastructure (e.g., cloud-based computing time using, e.g., Amazon Web Services (AWS) or equivalent). In addition, a traditional point-based map matcher considers every probe point independently, which can potentially lower the quality of matches. A traditional trajectory-based map matcher can consider the routing of the GPS traces, but the traditional trajectory-based map matcher takes an even longer time and are more expensive than the traditional point-based map matcher. By considering time and quality, a traditional point-based map matcher often has historically been selected the as the best choice for bulk data processing. Since the scale of data is huge in many uses case (e.g., 3 years of probe data can include millions of probe points), any small improvement in processing time may be beneficial.

To address this problem, the system 100 of FIG. 1 introduces a node-based map matcher to improve processing speed over a traditional point-based map matcher. For example, for a long link (e.g., a road or travel segment), there can many probes collecting probe points along the link. In one embodiment, if the system 100 knows the start of the probe trace (e.g., a set of probe points collected by the same probe during a single travel session) is matched to the start node of the link and the end of the probe trace is matched to the end of the link, then the system 100 knows all the middle probe points in the probe trace should belong to the link without having to consider or process any possibility to match against other neighboring links. In contrast, because point-based map matchers map each probe point independently, a traditional point-based map matcher would still try to figure out what is the best link to match even for these middle probe points, thereby using more computational results and taking more time than the embodiments of the node-based map matching approached described herein. In other words, the speed improvement of the embodiments described herein comes from not having to execute a matching algorithm on the probe points in the middle of a link. Accordingly, the magnitude of the speed improvement increases with the size of each probe trace or link, with longer links or traces exhibiting greater potential speed improvements.

In one embodiment, a "node" refers to a point in the map where there are more than two links connected. For example, with respect to a traditional node-link map representation, nodes exist at road intersections, splits, merges, and/or other similar features. However, it is also contemplated that the embodiments described here are applicable to any location point (e.g., not necessarily nodes or intersection points) occurring along a link of a transportation network. In other words, location points can include any point along a link regardless of whether there are more than two connecting links (e.g., location points can include points with only one or two links). By way of example, a link refers to a road or travel segment between two nodes or location points. Although various embodiments are discussed with respect to nodes, it is contemplated that the embodiments of node-based map matching described herein are also applicable to location points in general.

In one embodiment, the embodiments of node-based map matching described herein can be used with a tile-based representation of a digital map. For example, the system 100 can begin node-based map matching by starting at a selected map tile (e.g., a map tile at zoom level 14, with the starting zoom level being optimizable and configurable depending on available computing resources). In another embodiment, when not using a tile-based map representation, the system 100 can select any starting geographic area to begin map matching. Once the starting map tile or geographic area is selected, the system 100 collects probe data to be map matched within the selected tile or data.

In one embodiment, the system 100 processes the probe data to sort the probe points included therein into sessions or location traces indicating respective individual travel events or trips. The location traces or sessions groups the probe points as a sequence of probe points corresponding to a route or path traveled by the collecting probe. By way of example, in one embodiment, the probe data contains provider name and/or session identification. The system 100 can use these two variables to form a unique session key for each probe point in the probe data. The system 100 can then sort the probe data by session key, and timestamp. As a result, each session key contains list of probes sorted by timestamp, and corresponds to an individual location trace or session.

In one embodiment, the system 100 (e.g., via a map matching platform 101) performs node-base map matching using a stepwise approach based on the nodes and links within the selected map tile or geographic area. To initiate this stepwise approach, the system 100 can retrieve or prepare map data containing nodes (or location points) and links of the portion of a transportation network falling within the spatial boundaries of the selected map tile or geographic area. By way of example, the map data can be retrieved from a geographic database 103 and can include information to determine spatial relationships and connections between the nodes and links (e.g., which links connect to which nodes or location points).

For every node in the selected map tile or geographic area, the system 100 select probe points within a search radius (e.g., a circular search radius R). In one embodiment, the search radius R can be a static R, e.g., set at ~30 m or any other value, for all nodes. In other embodiments, the system 100 can determine a dynamic search radius R for each node based on parameters such as location sensor accuracy, road density, urban/rural, presence of tall buildings which may block GPS signals, number of available probe points, and/or any other features that can affect the distance threshold for matching to each node or location point.

Figure 2A:
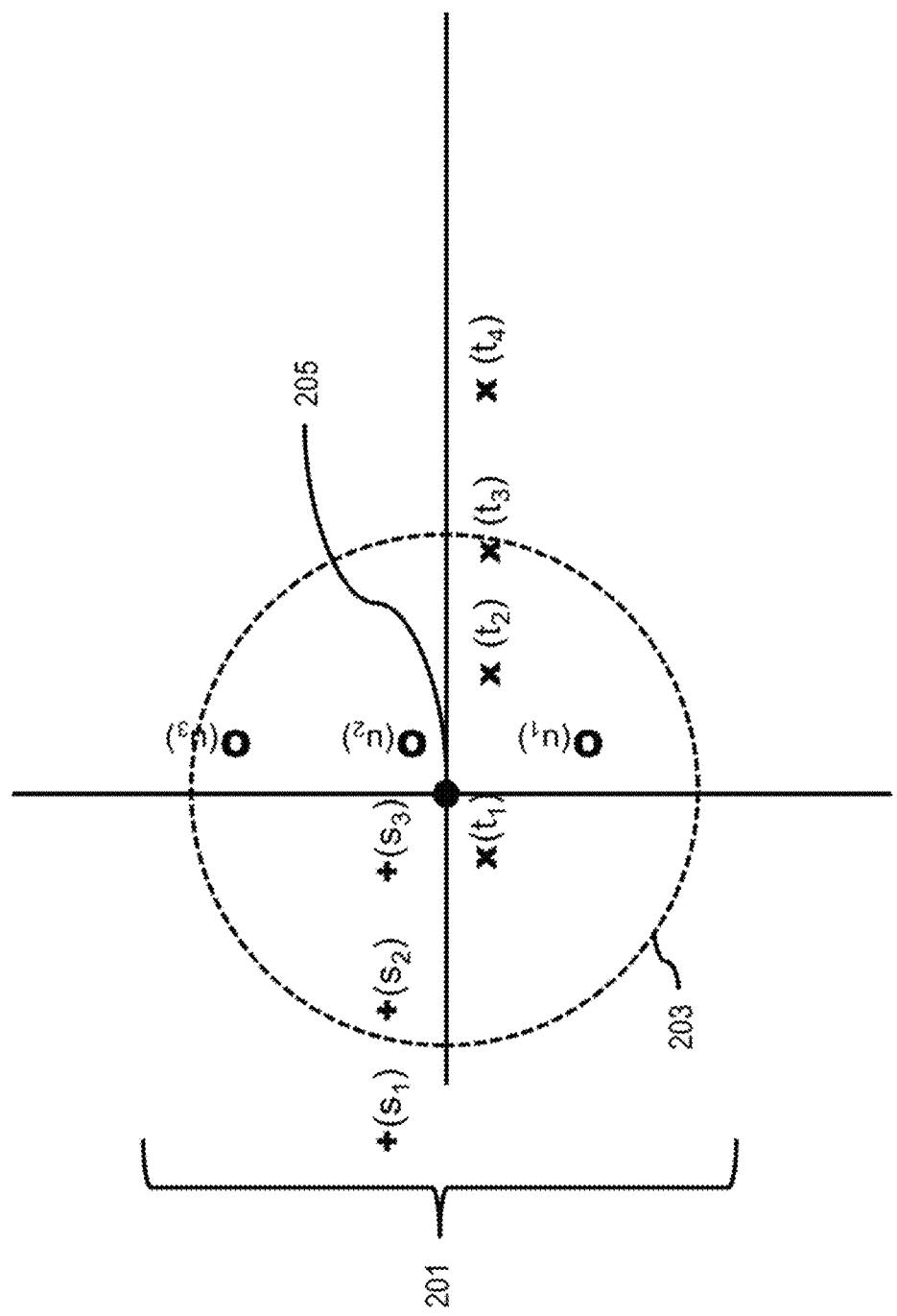
FIGS. 2A-2D are diagrams illustrating example processes for providing node-based map matching, according to various embodiments.

FIG. 2A is a diagram illustrating an example of selecting probe points based on a distance threshold (e.g., the search radius R) to facilitate node-based map matching, according to one embodiment. As shown, a set of probe points 201 includes probe points from three separate sessions or location traces (e.g., respectively represented by session keys "s", "t", and "u"). In one embodiment, each probe point can be identified using the session key or any other unique identifier for each location trace, and a unique number corresponding to each probe point (e.g., incremented integer value). Using this probe point notation, the sessions s, t, and u consists of: (1) probe points $s_1$-$s_3$ with respective locations indicated by "+" symbols, (2) probe points $t_1$-$t_4$ with respective locations indicated by "x" symbols, and (3) probe points $u_1$-$u_3$ with respective locations indicated by "o" symbols. In one embodiment, the system 100 can use any efficient data structure to represent the set of probe points 201 and their spatial information (e.g., a spatial index).

In one embodiment, the system 100 uses a search radius 203 (e.g., either a predetermined or dynamic distance threshold) surrounding a node or location point of interest (e.g., node 205) to select the probe points from the set 201 for evaluation. In the example of FIG. 2A, this results in selecting probe points $s_2$, $s_3$, $t_1$, $t_2$, $u_1$, $u_2$, and $u_3$ for evaluation. In one embodiment, for the selected probe points within the search radius of every node, the system 100 determines the closest probe point from each session or location trace (e.g., session keys s, t, and u) to the node so that there is chosen only one probe point for each session key for each node. In this example, the closest probe point from each session to the node 205 are: (1) probe point $s_3$ of session s, (2) probe point $t_1$ of session t, and (3) probe point $u_2$ of session U. In one embodiment, the system 100 stores the association between every node and the closest probe point from each session key in the geographic database 103 or other equivalent database using any data structure that can represent the relationship between the closest probe point and the corresponding node. The system 100 can continue processing each node in the selected map tile or geographic area to determine the closest probe points from each detected session to each node, thereby, creating a list of closest probe points for each node.

In one embodiment, for each node, the system 100 evaluates the list of closest probe points for that individual node. This evaluation includes, for instance, for each closest probe point from each session key, the system 100 determines any neighboring nodes that also have a closest probe point from the same session (e.g., based on the session key). In one embodiment, a neighboring node or location point shares a connecting link with node being evaluated. In some embodiments, the shared connecting link between the node and its neighboring can be multiple adjacent links that form a path between the two nodes. In yet another embodiment, the system 100 may allow multiple adjacent connecting links only if the adjacent links when those links form the only possible path (e.g., based on maneuvering data such as allowed or legal turns, directions of travel, etc.) between the two links.

Figure 2B:
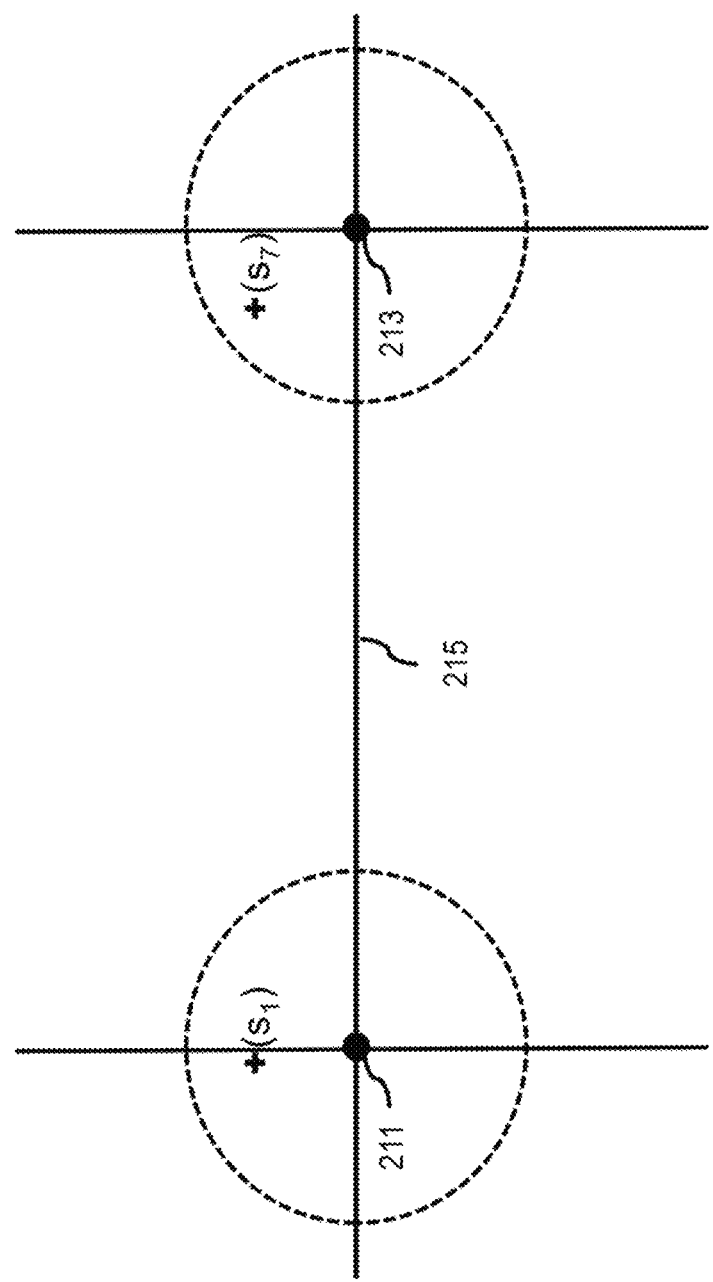

FIG. 2B is a diagram illustrating an example of finding a neighboring node with common probe session key, according to one embodiment. In the example of FIG. 2B, the system 100 is evaluating a node 211 with a closest probe $s_1$ from a session s to find any neighboring nodes with the same session key s. If there is no neighboring node, the system 100 proceeds to the next session or location trace associated with the node 211. If there are no more sessions for the node 211, the system 100 proceeds to the next node. In this example, the system 100 finds a neighboring node 213 (e.g., connected to the node 211 via a link 215) that also has a closest probe point from the session s (e.g., probe point $s_7$).

If there is only one neighboring node (e.g., as is the case with the example of FIG. 2B), the system 100 can project any probe points from the same session occurring between the node and it's single neighboring node to the link between the nodes. In other words, by projecting, the system 100 simply assigns the middle probe points as being matched to the link between the node and its neighboring without having to expend further computing resources to individually compare or use traditional map matching for those middle points, thereby advantageously improving computation speed and reducing computation resources when compared to traditional map matching processes.

Figure 2C:
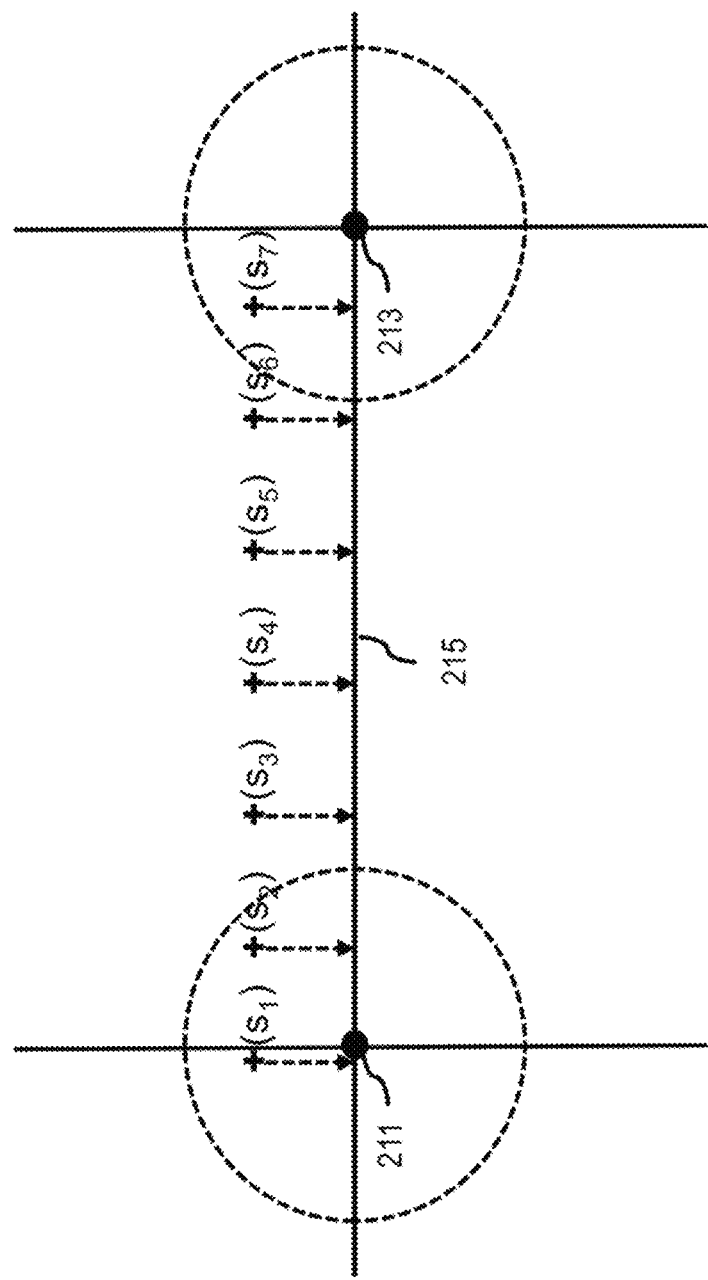

FIG. 2C continues the example of FIG. 2C to illustrate an example of this node-based projection or map matching process following identification of a neighboring node, according to one embodiment. As described above with respect to FIG. 2B, node 213 is found to be a neighboring node to node 211 with respect to session s (e.g., closest probe point s1 to node 211 and closest probe point s7 to node 213). Accordingly, the system 100 retrieves the middle probe points (e.g., probe points $s_2$ to $s_6$) to complete the entire set of probe points from session s that are located between nodes 211 and 213 (e.g., probe points $s_1$ to $s_7$), and projects them to the link 215 to perform node-based map matching. In one embodiment, projecting includes transforming the sensed location of the probe point (e.g., coordinates of the probe point determined from a location sensor of the probe) so that the resulting map matched coordinates fall on the link onto which probe point is projected at a location along the link that is relative to the sensed location of the probe point.

In one embodiment, if the projected position of probe point is the outside of the boundaries of a link, the probe point is not included in the projection or marked as "matched". These points can then be matched using other map matching processes known in the art (e.g., a traditional point-based map matcher).

In one embodiment, if there are more than two neighboring nodes that have the same session key, the system 100 can choose two nodes that have a longer time differences between the timestamp of the node in the iteration and the timestamp of the neighboring node. From the two identified nodes, the system 100 can get the two links between the node of interest and each of the two identified nodes and project all probe points within the time window of two neighboring nodes onto the two links.

Figure 2D:
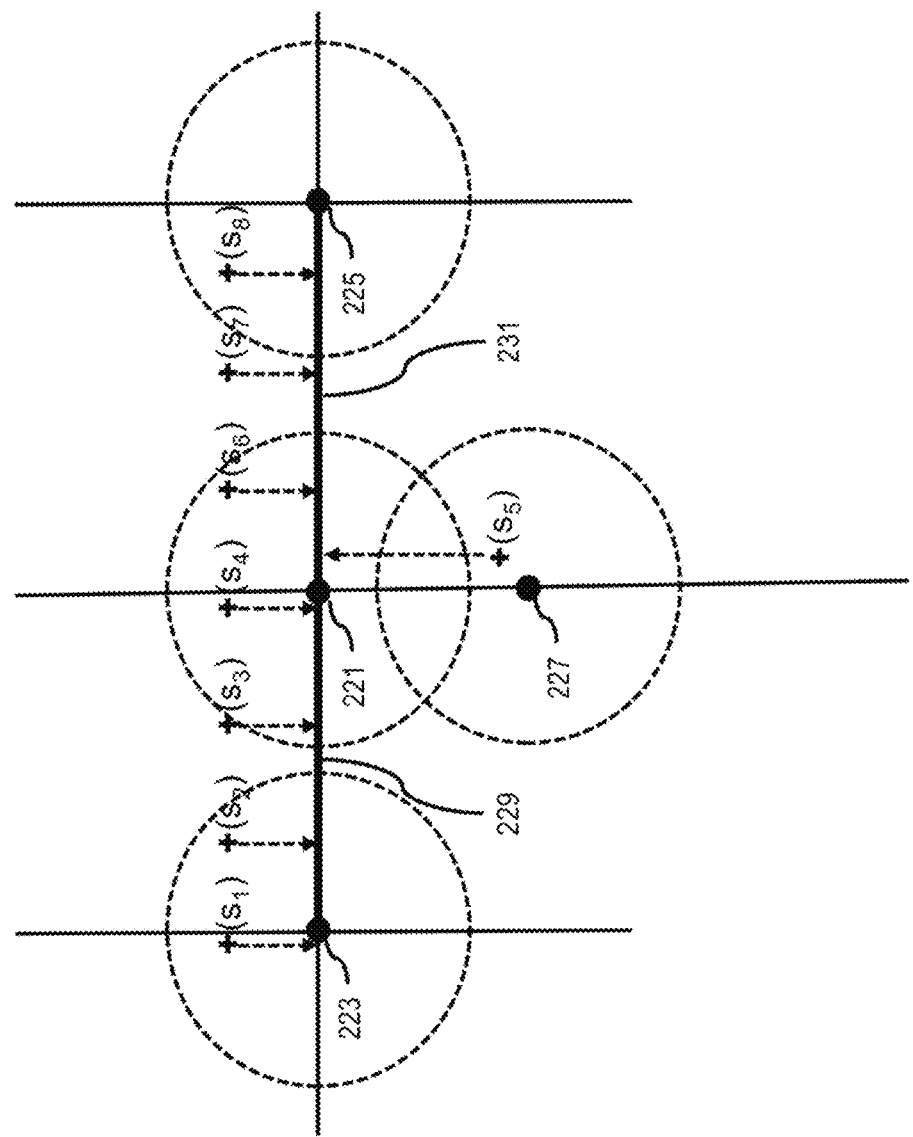

FIG. 2D illustrates an example use case of node-based map matching when there are more than two neighboring nodes, according to one embodiment. In the example of FIG. 2D, a node 221 is being evaluated to determine neighboring nodes 223-227 that also have closest probe points associated with a common session or location trace (e.g., as indicated by a shared session key). In this case, the probe points $s_1$-$s_8$ are part of a common location trace or session s. The closest probe point to the node 211 that is being evaluated is probe point $s_4$. As shown, three neighboring nodes 223-227 also have closest probe points from session s (e.g., probe point $s_1$ for neighboring node 223, probe point $s_8$ for neighboring node 225, and probe point $s_5$ for neighboring node 227).

In this case, because there are more than two neighboring nodes, the system 100 selects exactly two neighboring nodes from among the more than two neighboring nodes (e.g., three neighboring nodes 223-227) based on maximizing a time window covered by the respective probe points. For example, the probe points $s_1$-$s_8$ are arranged in chronological order. As a result, the time window between the probe point s1 of node 223 and probe point $s_8$ of node 225 is greater than either the time windows between nodes 223 and 227, and between nodes 227 and 225. Therefore, the system 100 selects neighboring nodes 223 and 225 to complete the node-based map matching according to the embodiments described herein.

In one embodiment, the system 100 then identifies the link 229 connecting the first selected neighboring node 223 and the evaluated node 221, and the link 231 connecting the evaluated node 221 to the second selected neighboring node 225. All of the probe points failing within the time window spanning the selected neighboring nodes 221 and 225 (e.g., probe points s1-s8) are then projected on to the links 229 and 231 to complete the node-based map matching for this road or travel segment. As discussed above, the projection of the probe points is computationally faster and less resource intensive that individually map matching each individual probe point using, e.g., a traditional point-based map matcher.

In one embodiment, the system 100 can remove the projected probe points from the probe list and/or mark them as "matched". If the projected position is the outside of the link, don't mark as "matched". By way of example, any probe points remaining on the probe list following iterating over all nodes or location points in the selected map tile or geographic area can then be map matched using other map matching means known in the art.

Because the system 100 performs the various embodiments of node-based map matching described herein on a node-by-node basis, there is a potential to create gaps between nodes where node-based map matching cannot be performed. By way of example, this can occur in situations including, but not limited to: (1) no immediate neighboring node with the same session key is found, but the session key is found in subsequent nodes; (2) there are multiple connecting links between two nodes so that a unique path cannot be determined; and/or the like.

To address this problem, the system 100 can further process the data associating each node with its respective closest probe points from each identified session or location trace. For example, from the probe data sorted according to session key or location trace, the system 100 iterates over each session key. More specifically, for every session key or location trace identified in the probe data, the system 100 collects a list of nodes that have the matched session key.

In one embodiment, the system 100 then orders the nodes according to the timestamp data associated with the closest probe points of the matched session key. This ordering, for instance, sorts the list of nodes according to a chronological order in which the probe vehicle or device traveled through the nodes. The system 100 then traverses or loops over the ordered nodes to find a node that has only two links connected. In contrast, if there are multiple links connected to that node, it may not be obvious which link the probe vehicle or device actually traveled. If there is no node with only two links connected, the system 100 can use any other map matching process known in the art to match the probe points for the current session key, and move to the next session key.

If there is a node which has exactly two links connected, then the system uses that node as a starting point for traversing the ordered list of node. For example, the system 100 can start from that node and travel forward or backward to find the other edge of an adjacent node that shares a same link.

If two nodes that share a connecting a link are found, the system 100 collects probe points located between the two adjacent nodes and projects the probe points to the link. This projection results in map matching the probe points to the link. They system 100 then marks the projected probe points as "used" or with any other label indicating that those points have already been projected or matched to a link.

If there are no adjacent nodes that share a connecting link, but there is a node in the ordered list of nodes that has earlier timestamp than the current node of interest, then the system 100 infers that there is a gap between the current node and the earlier node. In one embodiment, the system 100 can use any routing algorithm known in the art to determining a route (e.g., identify nodes and links) spanning the gap between the current node and the earlier node. In addition or alternatively, the system 100 can collect the probe points occurring in the gap, and then apply any other map matching process known in the art to map match those points (e.g., a traditional point-based map matcher).

The system 100 then moves to session key of the node. If there is no additional session key for the node, the system 100 moves to the next node and repeats the same procedure until the iteration reaches to the end of node list. In one embodiment, if there are any unmatched or unused probe points with the session key that remains after the iteration, and those unmatched probe points have timestamps earlier than the timestamps of the probe points associated with an end node of the ordered list of nodes, the system 100 can apply any map matching process known in the art on those probe points to match them to the digital map. Whenever probe points for the probe list are map-matched by either the various embodiments of the node-based map matching process described herein or other map matching processes known in the art, the system 100 can mark the matched probes as "used" or any other similar flag or indicator, so that the system 100 can avoid using the matched probe points in again in later steps.

In one embodiment, the system 100 can iterate or traverse the sorted list of nodes for each session key directionally from the determined starting node (e.g., node with exactly two links connected). For example, the system 100 can first traverse backwards in chronological order from the starting node until the beginning of the node list, and then traverse forward from the starting node to the end of the node list in similar manner. In one embodiment, when the system 100 reaches the end of the node list, the probe points occurring later than the end node and/or any remaining probe points that are not marked as "used" are matched using any other map matcher known in the art (e.g., a traditional point-based map matcher).

In one embodiment, the unmatched probe points may be indicative of new or changes in the geometry of the road or transportation network. Accordingly, instead of or in addition to attempting to map match using other means, the system 100 can pass the remaining set of unmatched probe points to another component of a map data generation pipeline to determine whether the unmatched probe points indicate a new road segment that should be mapped in the geographic database 103 as a new node or link record. By way of example, the probe points can be processed using any known method for determining a new link including, but not limited, to clustering, trajectory analysis, imagery analysis of the area, dispatch of a mapping vehicles or crews, etc.

By way of example, the various embodiments of the node-based map matching process described herein have several technical advantages over traditional point-based map matchers. For example, the speed or timing improvements from node-based map matching increases with the number of probes to be processed. Accordingly, when bulk processing millions of probe points, even small speed increases in processing time can result in significant improvements in computational speed compared with processing the same number of probe points using traditional point-based map matchers. In addition, because the embodiments described herein also consider time sequences of probe points when performing node-based map matching, the quality of matches can also be improved over traditional point-based map matchers. This quality, for instance, can approach the quality of traditional trajectory-based map matchers while improving computational speed and reducing computational resource requirements.

Returning to FIG. 1, as shown, the system 100 comprises one or more vehicles 105a-105n (also collectively referred to as vehicles 105) and/or one or more user equipment (UE) devices 107 that act as probes traveling over a road network (e.g., the transportation network 109). Although the vehicles 105 are depicted as automobiles, it is contemplated that the vehicles 105 can be any type of transportation vehicle, manned or unmanned (e.g., planes, aerial drone vehicles, motor cycles, boats, bicycles, etc.), and the UE 107 can be associated with any of the types of vehicles or a person or thing (e.g., a pedestrian) traveling within the transportation network 109. In one embodiment, each vehicle 105 and/or UE 107 is assigned a unique probe identifier (probe ID) for use in reporting or transmitting probe data collected by the vehicles 105 and UE 107. The vehicles 105 and UE 107, for instance, are part of a probe-based system for collecting probe data for measuring traffic conditions in a road network. In one embodiment, each vehicle 105 and/or UE 107 is configured to report probe data as probe points, which are individual data records collected at a point in time that records telemetry data for that point in time. The probe points can be reported from the vehicles 105 and/or UEs 107 in real-time, in batches, continuously, or at any other frequency requested by the system 100 over, for instance, the communication network 111 for processing by the map matching platform 101.

In one embodiment, a probe point can include attributes such as: session key, data provider, probe ID, longitude, latitude, speed, and/or time. The list of attributes is provided by way of illustration and not limitation. Accordingly, it is contemplated that any combination of these attributes or other attributes may be recorded as a probe point (e.g., such as those previously discussed above). For example, attributes such as altitude (e.g., for flight capable vehicles or for tracking non-flight vehicles in the altitude domain), tilt, steering angle, wiper activation, etc. can be included and reported for a probe point. In one embodiment, if the probe point data includes altitude information, the transportation network, links, etc. can also be paths through an airspace (e.g., to track aerial drones, planes, other aerial vehicles, etc.), or paths that follow the contours or heights of a road network (e.g., heights of different ramps, bridges, or other overlapping road features).

In one embodiment, the vehicles 105 and/or UE 107 may include sensors for reporting measuring and/or reporting attributes. The attributes can also be any attribute normally collected by an on-board diagnostic (OBD) system of the vehicle, and available through an interface to the OBD system (e.g., OBD II interface or other similar interface).

In one embodiment, the system 100 can sort probe points according to location traces or trajectories using probe provider information and/or probe identifier (probe ID) information associated with the probe data. For example, the system 100 groups probe points into common sessions (e.g., identified using a session key) that represent individual trips of probe data collection sessions. The sessions can be identified by matching or grouping the probe points in the probe data according to probe identifier and sequencing the probe points according to time.

In one embodiment, the map matching platform 101 performs the processes for node-based map matching of probe data as discussed with respect to the various embodiments described herein. By way of example, the mapping platform 107 can be a standalone server or a component of another device with connectivity to the communication network 111. For example, the component can be part of an edge computing network where remote computing devices (not shown) are installed along or within proximity of the transportation network 109 to provide point-based map matching of probe data collected locally or within a local area served by the remote or edge computing device.

In one embodiment, the map matching platform 101 has connectivity or access to a geographic database 103 that includes mapping data about a road network, including but not limited to the nodes/location points and links comprising the network (additional description of the geographic database 103 is provided below with respect to FIG. 4). In one embodiment, the probe data, map matching results, and/or related information can also be stored in the geographic database 103 by the map matching platform 101. In addition or alternatively, the probe data can be stored by another component of the system 100 in the geographic database 103 for subsequent retrieval and processing by the map matching platform 101.

In one embodiment, the vehicles 105 and/or UE 107 may execute an application 113 to present or use the results of node-based map matching generated by the map matching platform 101 according to the embodiments described herein. For example, if the application 113 is a navigation application then the node-based map matching results can be used to determine positioning information, routing information, provide updated estimated times of arrival (ETAs), and the like.

By way of example, the UE 107 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.). In one embodiment, the UE 107 may be associated with a vehicle 105 (e.g., cars), a component part of the vehicle 105, a mobile device (e.g., phone), and/or a combination of thereof. Similarly, the vehicle 105 may include computing components that can perform all or a portion of the functions of the UE 107.

By way of example, the application 113 may be any type of application that is executable at the vehicle 105 and/or the UE 107, such as mapping applications, location-based service applications, navigation applications, content provisioning services, camera/imaging application, media player applications, social networking applications, calendar applications, and the like. In one embodiment, the application 113 may act as a client for the map matching platform 101 and perform one or more functions of the map matching platform 101 alone or in combination with the platform 101.

In one embodiment, the vehicles 105 and/or the UE 107 are configured with various sensors for generating probe data. By way of example, the sensors may include a global positioning sensor for gathering location data (e.g., GPS), Light Detection And Ranging (LIDAR) for gathering distance data and/or generating depth maps, infrared sensors for thermal imagery, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, switch sensors for determining whether one or more vehicle switches are engaged, and the like.

In another embodiment, the sensors of the vehicles 105 and/or UE 107 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors may detect weather data, traffic information, or a combination thereof.

These data, for instance, can also be reported as probe data. In one example embodiment, the vehicles 105 and/or UE 107 may include GPS receivers to obtain geographic coordinates from satellites 115 for determining current location and time associated with the vehicle 105 and/or UE 107 for generating probe data. Further, the location can be determined by a triangulation system such as A-GPS, Cell of Origin, or other location extrapolation technologies.

The communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the map matching platform 101 may be a platform with multiple interconnected components. The map matching platform 101 may include multiple servers, intelligent networking devices, computing devices, components and corresponding software for providing trajectory bundles for map data analysis. In addition, it is noted that the mapping platform 107 may be a separate entity of the system 100, a part of one or more services 117a-117m (collectively referred to as services 117) of the services platform 117, or included within the UE 107 (e.g., as part of the applications 113).

The services platform 119 may include any type of service 117. By way of example, the services 117 may include mapping services, navigation services, traffic monitoring services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 119 may interact with the map matching platform 101, the vehicle 105, the UE 107, and/or one or more content providers 121a-121k (also collectively referred to as content providers 121) to provide the services 117, for instance, based on node-based map matching results generated by the map matching platform 101.

In one embodiment, the content providers 121 may provide content or data to the vehicles 105 and/or UEs 107, the map matching platform 101, and/or the services 117. The content provided may be any type of content, such as mapping content, textual content, audio content, video content, image content, etc. In one embodiment, the content providers 121 may provide content that may aid in the point-based map matching using a machine learning approach according to the various embodiments described herein. In one embodiment, the content providers 121 may also store content associated with the vehicles 105, the UE 107, the map matching platform 101, and/or the services 117. In another embodiment, the content providers 121 may manage access to a central repository of data, and offer a consistent, standard interface to data, such as a repository of probe data, probe features/attributes, link features/attributes, etc. Any known or still developing methods, techniques or processes for retrieving and/or accessing feature values for probe points and/or road links from one or more sources may be employed by the map matching platform 101.

By way of example, the vehicles 105, the UEs 107, the map matching platform 101, the services platform 119, and/or the content providers 121 communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3:
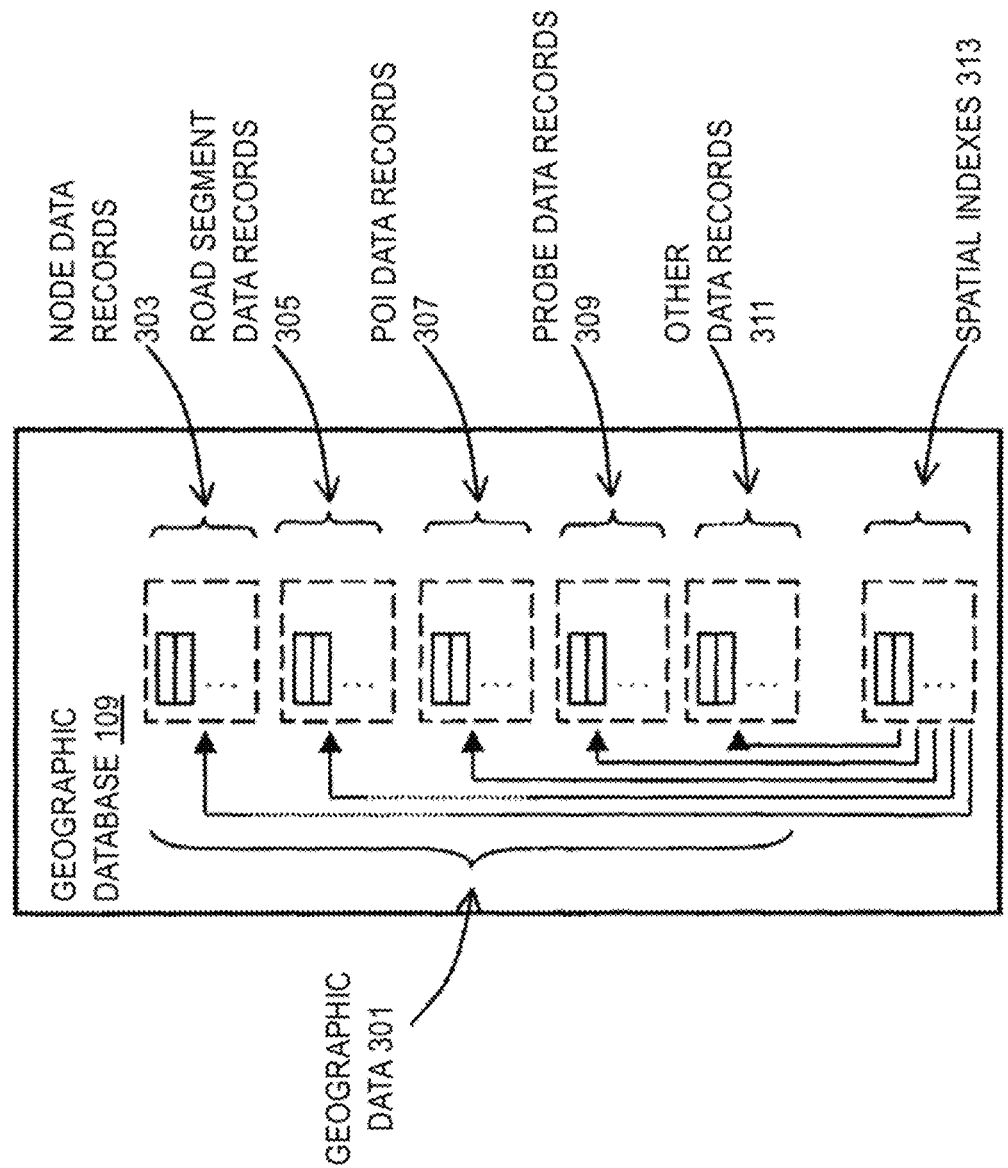
FIG. 3 is a diagram of a geographic database, according to one embodiment.

FIG. 3 is a diagram of the geographic database 103 of system 100, according to exemplary embodiments. In the exemplary embodiments, POIs and map generated POIs data can be stored, associated with, and/or linked to the geographic database 103 or data thereof. In one embodiment, the geographic database 103 includes geographic data 301 used for (or configured to be compiled to be used for) mapping and/or navigation-related services, such as for personalized route determination, according to exemplary embodiments. For example, the geographic database 103 includes node data records 303, road segment or link data records 305, POI data records 307, probe data records 309, and other data records 311, for example. More, fewer or different data records can be provided. In one embodiment, the other data records 311 include cartographic ("carto")

data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using the point-based map matching embodiments describes herein), for example.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions, models, routes, etc. Accordingly, the terms polygons and polygon extrusions/models as used herein can be used interchangeably.

In one embodiment, the following terminology applies to the representation of geographic features in the geographic database 103.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 103 follows certain conventions. For example, links do not cross themselves and do not cross each other except at a node or vertex. Also, there are no duplicated shape points, nodes, or links. Two links that connect each other have a common node or vertex. In the geographic database 103, overlapping geographic features are represented by overlapping polygons. When polygons overlap, the boundary of one polygon crosses the boundary of the other polygon. In the geographic database 103, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In exemplary embodiments, the road segment data records 305 are links or segments representing roads, streets, or paths, as can be used in the calculated route or recorded route information for determination of one or more personalized routes, according to exemplary embodiments. The node data records 303 are end points or vertices corresponding to the respective links or segments of the road segment data records 305. The road link data records 305 and the node data records 303 represent a road network, such as used by vehicles, cars, and/or other entities. Alternatively, the geographic database 103 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 103 can include data about the POIs and their respective locations in the POI data records 307. The geographic database 103 can also include data about places, such as cities, towns, or other communities, and other geographic features, such as bodies of water, mountain ranges, etc. Such place or feature data can be part of the POI data records 307 or can be associated with POIs or POI data records 307 (such as a data point used for displaying or representing a position of a city). In addition, the geographic database 103 can include data from radio advertisements associated with the POI data records 307 and their respective locations in the radio generated POI records 309.

In one embodiment, the geographic database 103 includes probe data records 309 which store probe point data, session keys, location traces, associations between nodes and respective closest probe points or sessions keys, node lists, and/or any other information used or generated by the map matching platform 101 to provide node-based map matching according to the various embodiments. For example, the probe data records 309 can store collected probe point data for map matching in a spatial index or other data structure that records spatial information and relationships of the probe points.

In one embodiment, to begin bulk node-based map matching (e.g., bulk processing of millions of probe point records), a spatial index for all probe points in a given area of the map (e.g., an area corresponding to a selected map tile or geographic) that is currently being processed. By way of example, the spatial index data structure can be based on any structure including, but not limited to: Kd-trees, R-trees, and Quadtrees. Each of the types of structures may have advantages and disadvantages with respect to node-based map matching, and the map matching platform 101 can balance these advantages/disadvantages to select an appropriate data structure. For example, with respect to Kd-trees, the advantages are that implementation can be simple, and indexing time can be extremely fast; while disadvantages are that this results in an unbalanced tree, unless sorting of input is precomputed, which can slow query times on non-uniform data. With respect to R-trees, the advantages are that this results in a balanced tree, which in turn can provide fast query times; while the disadvantages are that depending on the heuristic picked for insertion, indexing time may be slower, and implementation of R-trees can be complex. With respect to Quadtrees, the advantages are that indexing and implementation can be relatively simple; while the disadvantages are that this results in an unbalanced tree which can slow query times on unbalanced data.

The geographic database 103 can be maintained by the content provider 121 in association with the services platform 119 (e.g., a map developer). The map developer can collect geographic data to generate and enhance the geographic database 103. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database 103 or data in the master geographic database 103 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 105 or UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 103 can be a master geographic database, but in alternate embodiments, the geographic database 103 can represent a compiled navigation database that can be used in or with end user devices (e.g., vehicle 105, UE 107, etc.) to provide navigation-related functions. For example, the geographic database 103 can be used with the end user device to provide an end user with navigation features. In such a case, the geographic database 103 can be downloaded or stored on the end user device (e.g., vehicle 105, UE 107, etc.), such as in application 113, or the end user device can access the geographic database 103 through a wireless or wired connection (such as via a server and/or the communication network 111), for example.

In one embodiment, the end user device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 107) can be a cellular telephone. An end user can use the device navigation functions such as guidance and map display, for example, and for determination of route information to at least one identified point of interest, according to exemplary embodiments.

Figure 4:
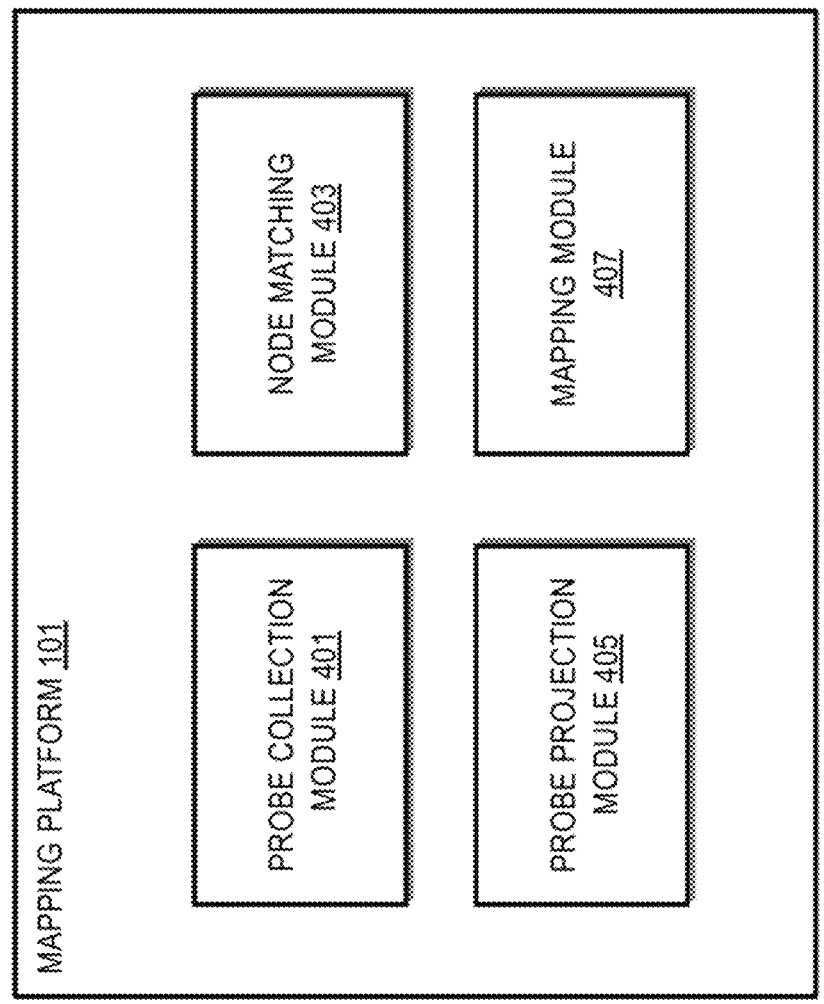
FIG. 4 is a diagram of the components of a map matching platform, according to one embodiment.

FIG. 4 is a diagram of the components of a map matching platform 101, according to one embodiment. By way of example, the map matching platform 101 includes one or more components for node-based map matching according to the various embodiments described herein. It is contemplated that the functions of these components may be combined or performed by other components of equivalent functionality. In this embodiment, the map matching platform 101 includes a probe collection module 401, a node matching module 403, a probe projection module 405, and a mapping module 407. The above presented modules and components of the map matching platform 101 can be implemented in hardware, firmware, software, or a combination thereof. Though depicted as a separate entity in FIG. 1, it is contemplated that the map matching platform 101 may be implemented as a module of any of the components of the system 100 (e.g., a component of the vehicle 105 and/or the UE 107). In another embodiment, one or more of the modules 401-407 may be implemented as a cloud based service, local service, native application, or combination thereof. The functions of these modules are discussed with respect to FIGS. 5-7 below.

Figure 5:
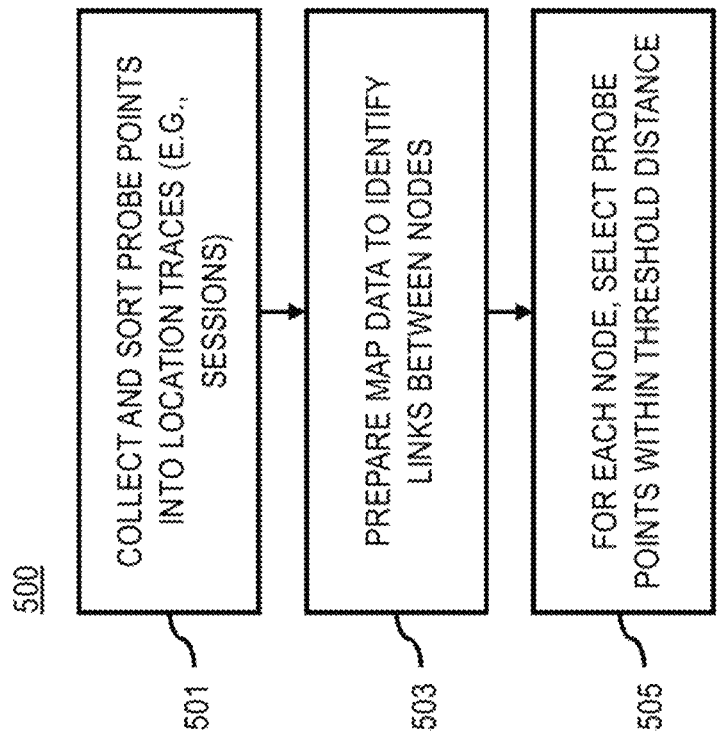
FIG. 5 is a flowchart of a process for selecting probe data for node-based map matching, according to one embodiment.
Figure 9:
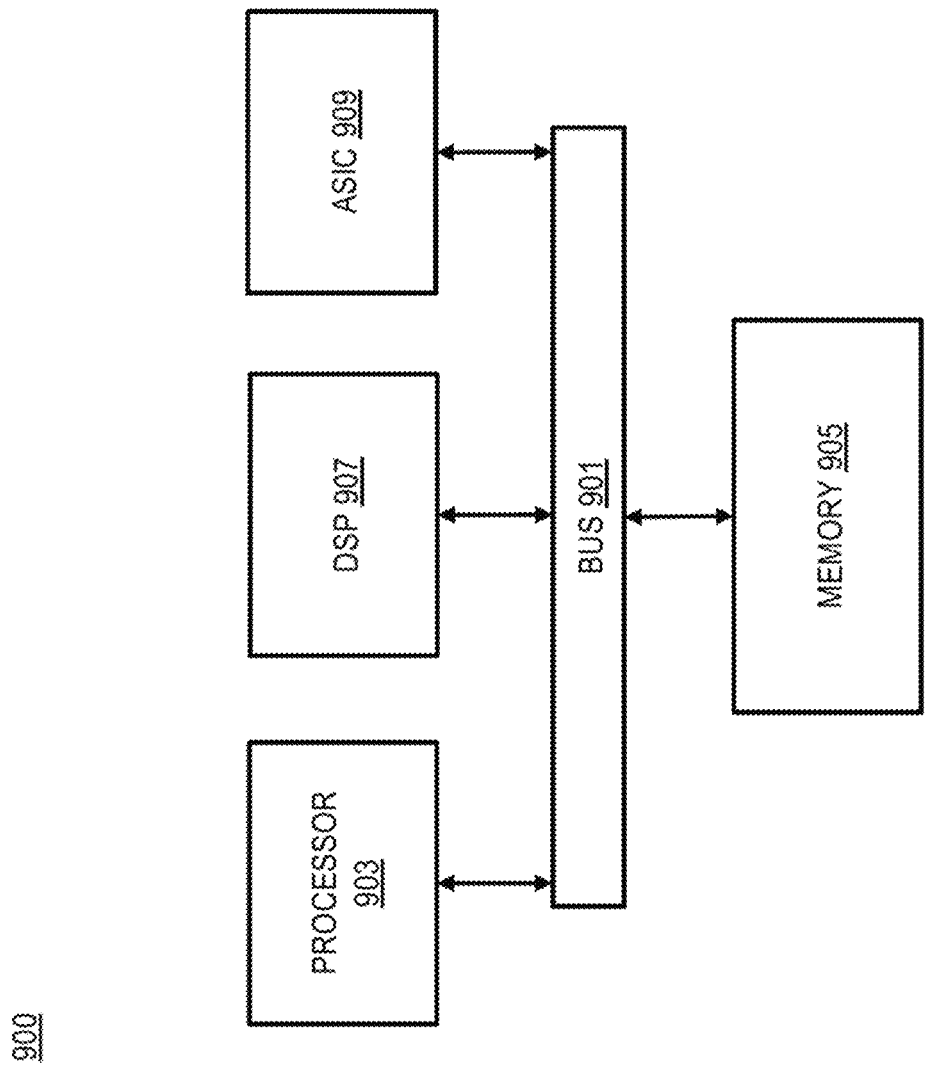
FIG. 9 is a diagram of a chip set that can be used to implement an embodiment.

FIG. 5 is a flowchart of a process for selecting probe data for node-based map matching, according to one embodiment. In various embodiments, the map matching platform 101 and/or any of the modules 401-407 of the map matching platform 101 as shown in FIG. 4 may perform one or more portions of the process 500 and may be implemented in, for instance, a chip set including a processor and a memory as shown in FIG. 9. As such, the map matching platform 101 and/or the modules 401-407 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In one embodiment, the process 500 illustrates example pre-processing steps to prepare probe data for node-based map matching according to the various embodiments described herein.

In step 501, the probe collection module 401 collects and sorts probe points into location traces or sessions. As previously described, the probe points can be included in probe data collected from a geographic area delineated by a selected map tile (e.g., when using a tile-based digital map representation) and/or any other selected geographic boundary. The probe data collection module 401 then processes the probe data to sort the plurality of probe points of the probe data into one or more location traces. In one embodiment, the each probe point in a location trace can be labeled or identified to indicate that they are grouped or sorted into a common location trace or session. The probe collection module 401, for instance, can create a unique session key to associate with or identify each probe point in a particular location trace or session. The collected and sorted probe points can be stored in, for instance, a spatial index as described above or any other equivalent data structure.

In step 503, the mapping module 407 can prepare map data to identify the links between nodes or other location points occurring in the selected map tile or geographic area from which the probe data was collected and sorted. In one embodiment, the links and nodes of the selected map tile or geographic area are part of a node-link map representation and can be queried or determined from the geographic database 103.

In one embodiment, the map matching platform 101 can use the identified links and nodes to perform node-based map matching in a stepwise or looped manner that traverses the a given area of the digital map (e.g., the selected map tile or geographic area) on a node-by-node basis until all nodes in the area are processed (e.g., when performing bulking matching of probe points). Accordingly, in step 505, the node matching module 403 selects a subset of the plurality of probe points within a threshold distance of a node or location point of a map representation of a transportation network. For example, the node matching module 403 traverses the node list generated for the selected map tile or area, to select probe points within a search radius (e.g., a predetermined or dynamic radius) of each node for further processing according to the processes described below. In one embodiment, the selected probe points for each node can be indicated in the spatial index or other data structured discussed above.

Figure 6:
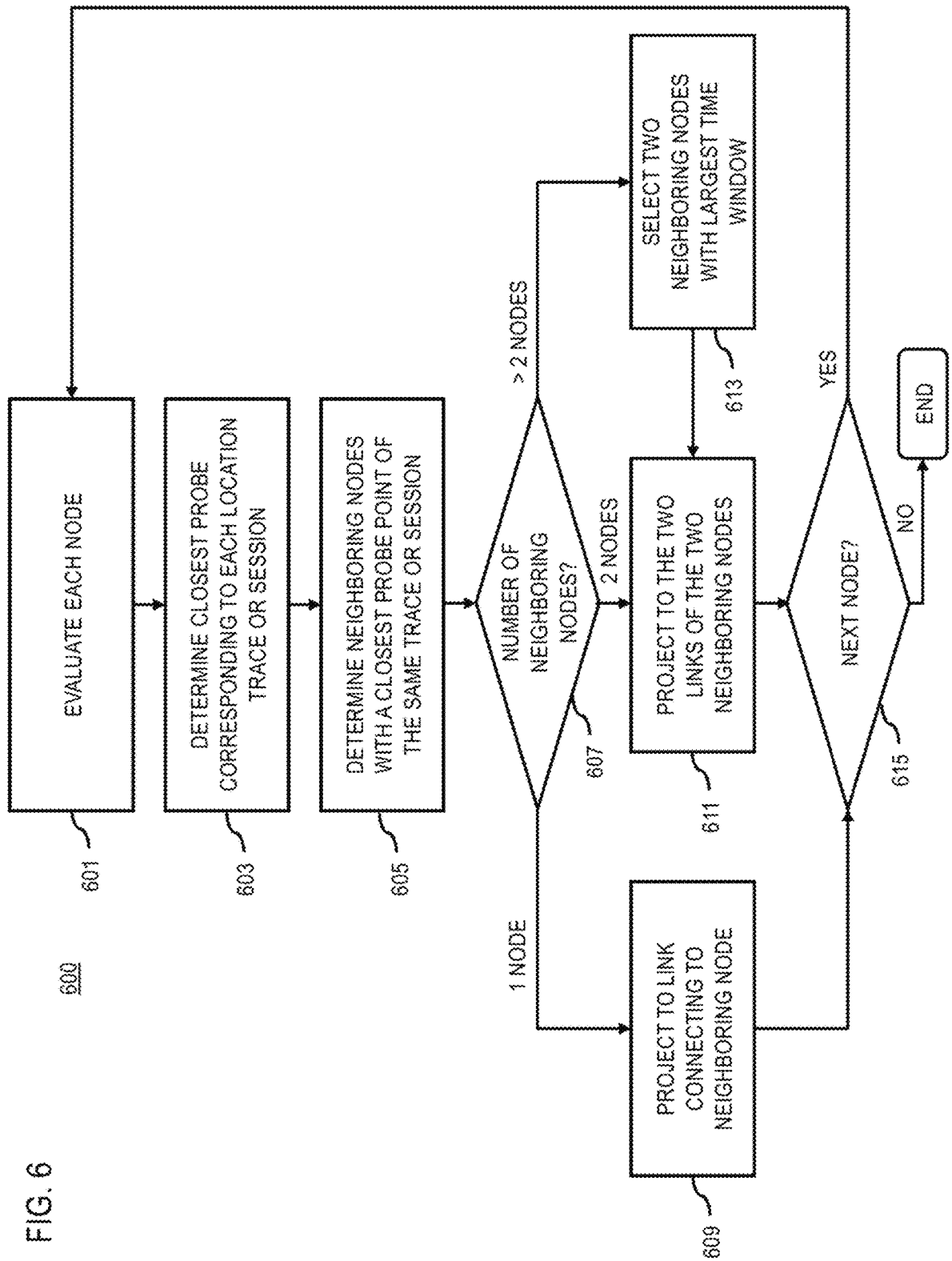
FIG. 6 is a flowchart of a process for node-based map matching, according to one embodiment.

FIG. 6 is a flowchart of a process for node-based map matching, according to one embodiment. In various embodiments, the map matching platform 101 and/or any of the modules 401-407 of the map matching platform 101 as shown in FIG. 4 may perform one or more portions of the process 600 and may be implemented in, for instance, a chip set including a processor and a memory as shown in FIG. 9. As such, the map matching platform 101 and/or the modules 401-407 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

In one embodiment, the process 600 can be performed following one or more of the pre-processing steps described with respect to the process 500 of FIG. 5. For example, in one embodiment, the process 600 begins after the map matching platform 101 has selected the sorted probe points falling within a distance threshold or search radius of each node. This pre-selection means, for instance, that the embodiments of node-based map matching process described need to expend computational resources to process the location data of only the selected probe points for map matching and not all of the individual probe points as would be required when using a traditional point-based map matcher.

In step 601, the node matching module 403 retrieves the node list of the selected map tile or geographic area (e.g., as generated according to the process 500 of FIG. 5 above), and evaluates each location point or node in the node list. In one embodiment, the node matching module 403 iterates over the node list on the basis of the location traces or sessions identified in the sorted probe data. For example, for each location trace or session identified, the node matching module 403 initiates a node-based map matching of each location trace by determining a closest probe point to a target location point or node being evaluated (step 603). In one embodiment, the closest probe point of each identified location trace or session can be determined from the spatial index or other data structure of the created above. The node matching module can then associate the closest probe points and their respective location traces or sessions (e.g., by using their session keys or other unique identifier of the location trace) with the node in a data structure. In one embodiment, the closest points for each session can be determined and recorded for all nodes on the node list.

In step 605, the node matching module 403 determine another closest probe point to one or more neighboring nodes or location points. This other closest probe point is, for instance, another probe point with the same session key as the closest probe point of the node currently being evaluated. Because these probe points share the same session key (i.e., are part of the same location trace), the map matching platform 101 can assume that the same probe traveled through those nodes or location points. In one embodiment, a neighboring node is connected to the node currently being evaluated by at least one link.

In step 607, the node matching module 403 determines how many neighboring nodes are detected. In step 609, if there is only one neighboring node or location point, the node matching module 403 interacts with the probe projection module 405 to project the plurality of probe points between the closest probe point to the node and the another closest probe point to the neighboring node onto the link to map match the plurality of probe points to the link. In other words, the node matching module 403 is configured to assume that one probe points of the same session or location train are found close to nodes that define the start and end of a link, then the probe points of the same session or location trace occurring between nodes belong on the link because that is the only travel path available between the link. Accordingly, no additional processing of the middle probe points is performed by the map matching platform 101 to map match those middle probe points to the link, other than simply projecting those probe points onto the link. As described above, in one embodiment, the process of projecting is a transforming of the sensed location coordinates of each probe point onto the link to which the map matching platform 101 has already determined as the match for that probe point.

In step 611, if there are two neighboring nodes (e.g., with the current in between the two neighboring nodes), the node matching module 403 can retrieve the respective links for both nodes. The probe projection module 405 can then project all probe points between the two neighboring nodes only the respective links. Alternatively, the node matching module 403 can treat each of the two neighboring nodes individually as a single node as described with respect to step 607.

In step 613, if there are more than two neighboring nodes, the node matching module 403 can use any criteria to select two neighboring nodes from among the more than two neighboring locations points to perform the map matching. For example, one possible criteria can be based on timestamp data. Other criteria can include, but limited to, route popularity, user preference, historical user travel patterns, etc. In one embodiment, with respect to timestamp data, the node matching module 403 can select the two neighboring nodes from among the more than two nodes based on maximizing a time window calculated from the timestamp data. In other words, as discussed above, the node matching module 403 can chose two nodes that have the longer time differences between the timestamps of probe points closest to the current node and the timestamp of the neighboring node. By maximizing the time window, the node matching module 403, for instance, can also maximizing the length of the session or location trace that are matched to the digital map.

In one embodiment, once the two neighboring nodes are selected, the node matching module 403 can interact with the probe projection module 405 to project the probe points on the corresponding links as describe with respect to step 611 (e.g., the case with exactly two neighboring nodes). For example, the node matching module 403 determines respective links between the selected two neighboring nodes, and then projects the plurality of probe points falling within the time window to the respective links to map match the plurality of probe points to the respective links.

In step 613, the node matching module 403 determines whether there are more nodes remaining on the node list for the selected map tile or area, and whether to move onto the next node if one exists. For example, if there are no neighboring nodes detected for the current node in the iteration, the node matching module 615 can return to step 601 to evaluate the next node on the node list if one exists. In one embodiment, if there are neighboring nodes with respect to the current node and after processing those neighboring nodes and associated probe points according to steps 607-613, the node matching module 615 can remove any projected probes from the probe list (e.g., the spatial index of data structure of the collected and sorted probe points for a selected map tile or area) and/or otherwise marked them as "used" or "matched". The node matching module 403 can then return to step 601 to process the next node if one exists. If there is not a next node on the node list, the node matching module 403 ends the process.

In one embodiment, any probe points remaining after process 600 that are not marked as "used" or "matched" can be processed using any other map matching process (e.g., a traditional point-based map matcher) to complete the processing of the probe points.

Figure 7:
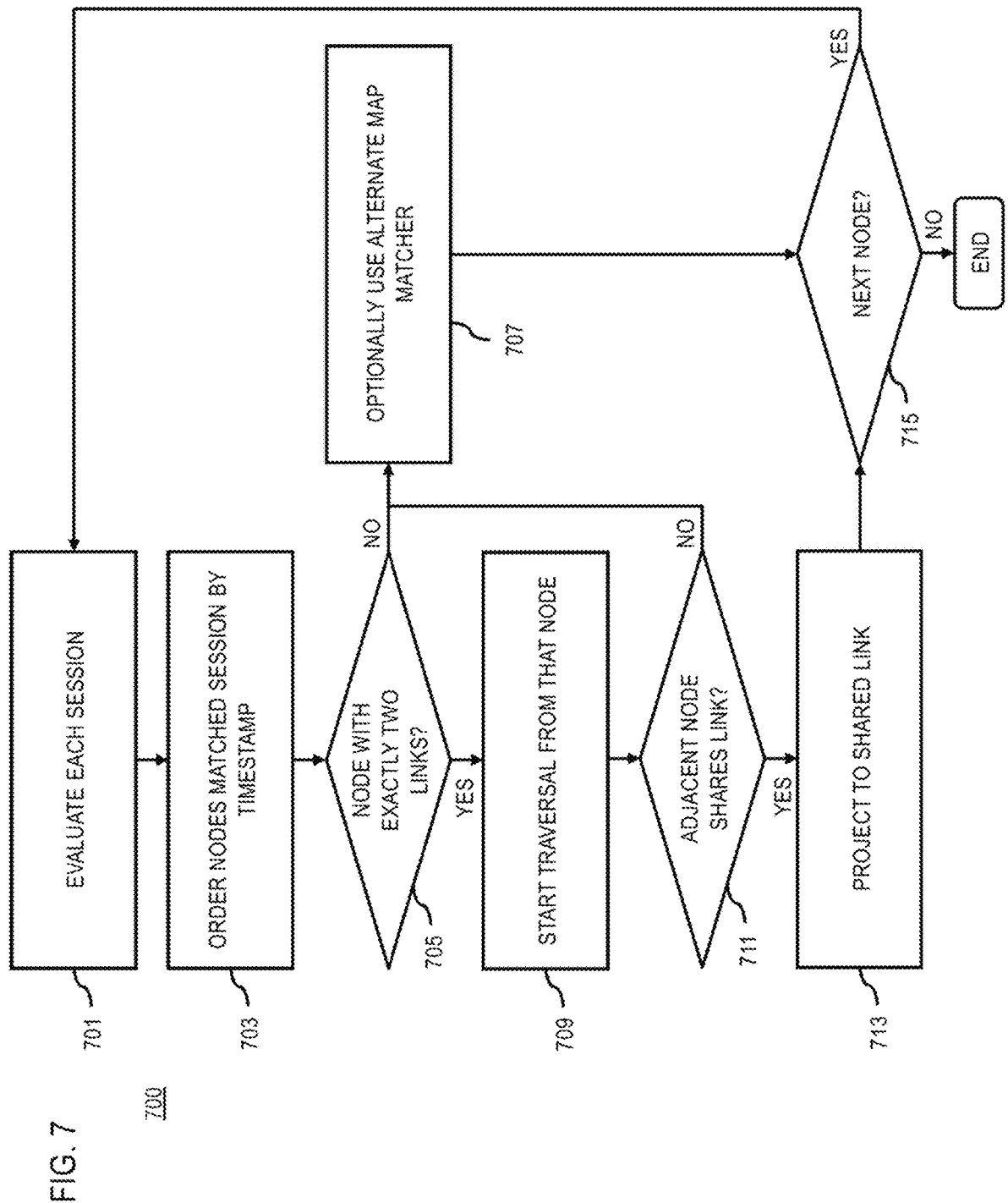
FIG. 7 is a flowchart of a process for evaluating shared links between location points or nodes to facilitate node-based map matching, according to one embodiment.

FIG. 7 is a flowchart of a process for evaluating shared links between location points or nodes to facilitate node-based map matching, according to one embodiment. In various embodiments, the map matching platform 101 and/or any of the modules 401-407 of the map matching platform 101 as shown in FIG. 4 may perform one or more portions of the process 700 and may be implemented in, for instance, a chip set including a processor and a memory as shown in FIG. 9. As such, the map matching platform 101 and/or the modules 401-407 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

The process 700 presents alternate or additional processes for performing node-based map matching. In one embodiment, the process 700 can be performed following any of the pre-processing steps of the process 500 of FIG. 5. In another, the process 700 can be performed in combination with the process 600 of FIG. 6 to process any remaining probe points that are not marked as "used" or "matched". In yet another embodiment, the process 700 can be performed independently of the process 600 of FIG. 6.

In step 701, the probe collection module 401 obtains a sorted probe data set for a selected map tile or geographic area (e.g., as generated according to the process 500 of FIG. 5). In addition, the sorted probe data set is processed to determine the closest probe points to each node with the selected map tile or geographic area (e.g., as determined according to step 603 of the process 600 of FIG. 6). Then, the node matching module 403 iterates over each location trace or session key identified in the sorted probe data. In one embodiment, for every location trace or session key identified in the sorted probe data, the node matching module 403 collects a list nodes that have closest probe points associated with the session key of the current iteration. In other words, the node matching module 403 determines all nodes to which at least one of the plurality of probe points associated with matched session key. The node matching module 403 then stores the determined nodes in a node list for the session key.

In step 703, the node matching module 403 sorts or orders the nodes in the node list according to timestamp data. As discussed above, each probe point includes a timestamp indicating the time that the probe point was collected. Accordingly, by sorting the node list by this timestamp data, the node matching module 403 creates node list in which the sequence of nodes in the list corresponds chronologically with the travel sequence of probe vehicle or device collecting the probe data. In other words, the first node on the node list would be the earliest detected node associated with travel of the probe vehicle for a given session in the selected map tile or geographic area, and the last node would be the latest detected node in the same travel session or location trace.

In step 705, the node matching module 403 traverses the ordered node list in timestamp order to determine whether said each node has exactly two links connected. In other words, the node matching module 403 traverses to find a node that has only two links connected. If no such node exists in the node list, the node matching module 403 can use any alternate map matcher to map match the probe points from the session (step 707).

In step 709, if there is a node with exactly two links, the node matching module 403 selects that node as a starting node from traversing the ordered node list. For example, the node matching module 403 can start from the node with exactly two links and travel backward and/or forwards to find the other edge of the node that shares a same link. In other words, the node matching module 403 traverses said ordered all nodes to determine whether an adjacent node shares at least one of the two links connected to the currently selected node in the iteration (step 711).

In step 713, if the adjacent node shares at least one of the two links connected to the current node, the node matching module 403 interacts with probe projection module 405 to project the plurality of probe points between the current node and the adjacent node to the at least one of the two links that is shared. If the adjacent node does not share at least one of the two links and there is an earlier or later node in the list associated with the same session key, there is likely a gap between the two nodes. In this case, the node matching module 403 performs step 707 to complete the map matching by, for instance, using a point-based map matcher or any other alternate map matcher for the plurality of probe points falling between said each node and the adjacent node.

In step 715, the node matching module 403 continues the traversal of the list by moving to the next node on the ordered node list until the end of list is reached. In one embodiment, the node matching module 403 can first traverse the list from the node determined to have exactly two links backwards in time to the beginning of the list. Once the beginning of the list is reached, the node matching module 403 can return to the starting node and proceed in a forward traversal to the end of the list. In one embodiment, as each probe point is used and projected to a link, the probe point can be marked as "used" or "matched" so that those probe points are not reprocessed in subsequent iterations or processes of the embodiments of node-based map matching described herein.

In one embodiment, if any probe points remaining after completing the iteration through the node list have not been marked as "used" or "matched", the node matching module 403 can process those remaining probe points using an alternate map matcher (e.g., a traditional point-based map matcher).

The processes described herein for providing node-based map matching of probe data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
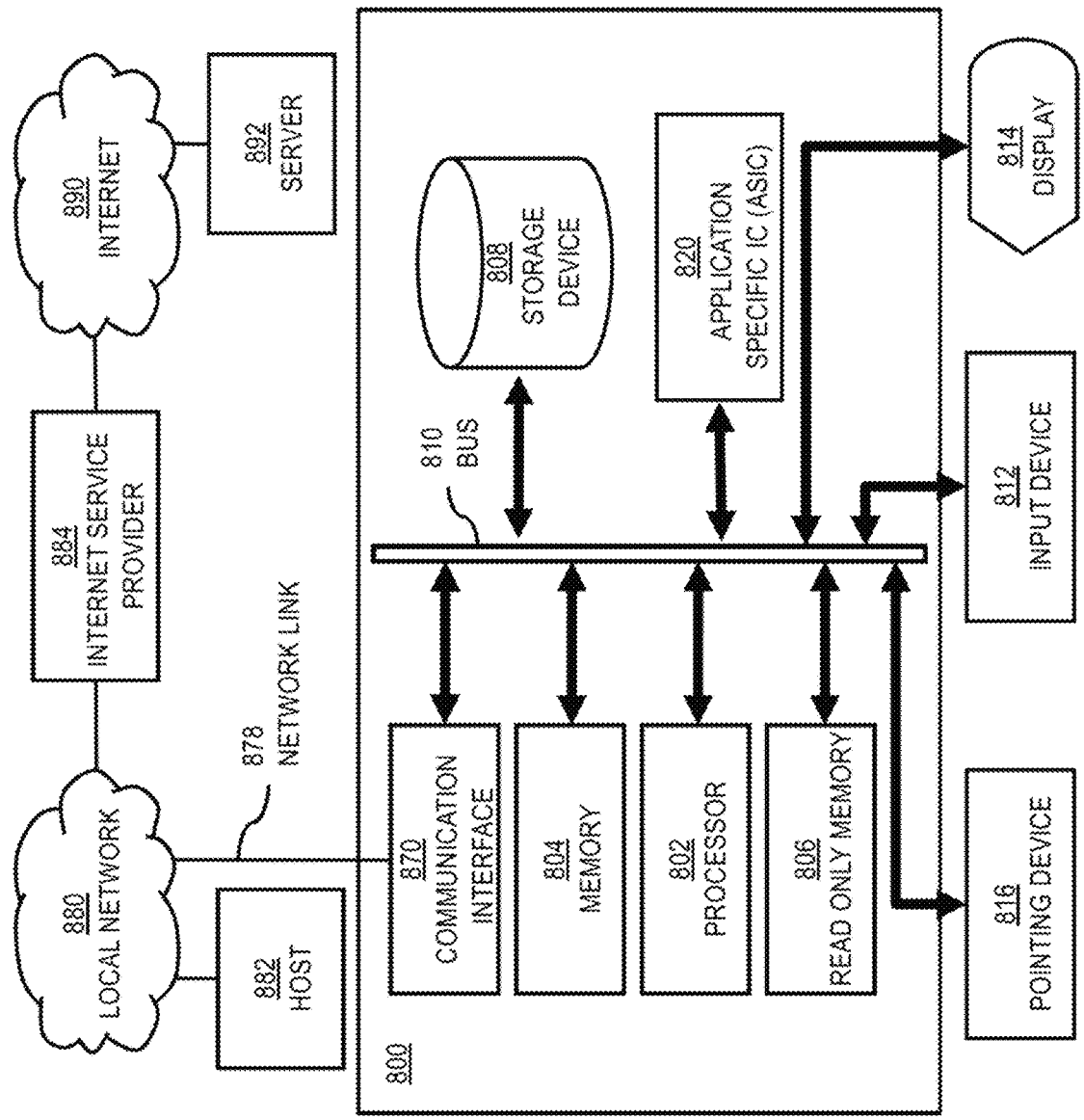
FIG. 8 is a diagram of a mobile terminal (e.g., handset) that can be used to implement an embodiment.

FIG. 8 illustrates a computer system 800 upon which an embodiment of the invention may be implemented. Computer system 800 is programmed (e.g., via computer program code or instructions) to provide node-based map matching of probe data as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing node-based map matching of probe data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing node-based map matching of probe data. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing node-based map matching of probe data, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810.

Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 111 for providing node-based map matching of probe data.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to provide node-based map matching of probe data as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide node-based map matching of probe data. The memory 905 also stores the data associated with or generated by the execution of the inventive steps.

Figure 10:
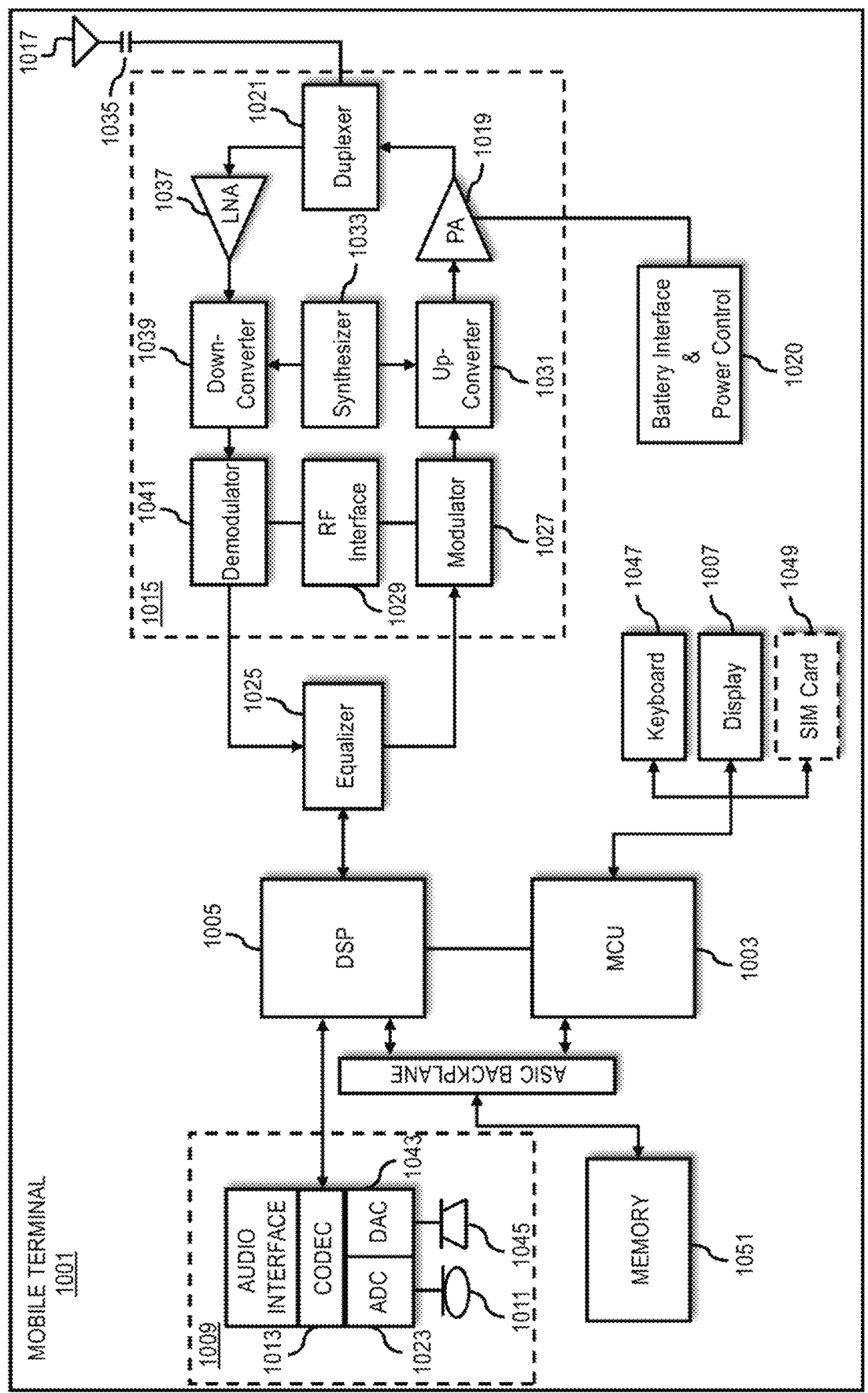
FIG. 10 is a diagram of hardware that can be used to implement an embodiment.

FIG. 10 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide node-based map matching of probe data. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for map matching probe data comprising:
    determining a first probe point for a start node of a road link from a first set of plurality of probe points within a dynamic distance threshold of the start node, wherein the first probe point is closest amongst the plurality of probe points to the start node;
    determining a second probe point for an end node of the road link from a second set of plurality of probe points within the dynamic distance threshold of the end node, wherein the second probe point is closest amongst the plurality of probe points to the end node, and wherein the second probe point is identified by a same session key as the first probe point;
    retrieving one or more other probe points with the same session key and occurring between the first probe point and the second probe point; and
    projecting the one or more other probe points on the road link for map matching by transforming sensed location coordinates of the one or more other probe points.

2. The method of claim 1, further comprising:
    selecting a map tile representation of a digital map, wherein the first probe point, the second probe point, the one or more other probe points, or a combination thereof are collected from a geographic area represented by the map tile representation.

3. The method of claim 2, wherein a zoom level of the map tile representation is selectable.

4. The method of claim 2, wherein the first probe point, the second probe point, the one or more other probe points are collected from within a specified search radius.

5. The method of claim 4, wherein the specified search radius is a dynamic search radius, and wherein the dynamic search radius is based on a location sensor accuracy, a road density, an urban/rural attribute, a presence of tall buildings, a number of available probe points, or a combination thereof.

6. The method of claim 4, wherein the specified search radius is determined on a node-by-node basis, and wherein the specified search radius is a static search radius.

7. The method of claim 1, further comprising:
selecting a geographic area to map match,
wherein the first probe point, the second probe point, the one or more other probe points, or a combination thereof are collected from the geographic area.

8. The method of claim 1, wherein the same session key corresponds to a route traveled by a collecting probe.

9. The method of claim 1, wherein the map matching of the one or more other probe points is based on the sensed location coordinates occurring within boundaries of the road link.

10. The method of claim 1, wherein selecting the start node and the end node is based on maximizing a time window calculated from a timestamp data, and wherein the projected one or more other probe points falls within the time window.

11. An apparatus for map matching probe data comprising:
at least one processor; and
at least one memory including computer program code for one or more programs,
the at least one memory and the computer program code configured to, with the at least one processor, cause the apparatus to perform at least the following,
determine a first probe point for a start node of a road link from a first set of plurality of probe points within a dynamic distance threshold of the start node, wherein the first probe point is closest amongst the plurality of probe points to the start node;
determine a second probe point for an end node of the road link from a second set of plurality of probe points within the dynamic distance threshold of the end node, wherein the second probe point is closest amongst the plurality of probe points to the end node, and wherein the second probe point is identified by a same session key as the first probe point;
retrieve one or more other probe points with the same session key and occurring between the first probe point and the second probe point to the road link; and
project the one or more other probe points on the road link for map matching by transforming sensed location coordinates of the one or more other probe points.

12. The apparatus of claim 11, wherein the apparatus is further caused to:
select a map tile representation of a digital map,
wherein the first probe point, the second probe point, the one or more other probe points, or a combination thereof are collected from a geographic area represented by the map tile representation.

13. The apparatus of claim 12, wherein a zoom level of the map tile representation is selectable.

14. The apparatus of claim 12, wherein the first probe point, the second probe point, the one or more other probe points are collected from within a specified search radius.

15. The apparatus of claim 14, wherein the specified search radius is a dynamic search radius.

16. A non-transitory computer-readable storage medium for map matching probe data carrying one or more sequences of one or more instructions which, when executed by one or more processors, cause an apparatus to at least perform the following steps:
determining a first probe point for a start node of a road link from a first set of plurality of probe points within a dynamic distance threshold of the start node, wherein the first probe point is closest amongst the plurality of probe points to the start node;
determining a second probe point for an end node of the road link from a second set of plurality of probe points within the dynamic distance threshold of the end node, wherein the second probe point is closest amongst the plurality of probe points to the end node, and wherein the second probe point is identified by a same session key as the first probe point;
retrieving one or more other probe points with the same session key and occurring between the first probe point and the second probe point; and
projecting the one or more other probe points on the road link for map matching by transforming sensed location coordinates of the one or more other probe points.

17. The non-transitory computer-readable storage medium of claim 16, wherein the apparatus is further caused to perform:
selecting a map tile representation of a digital map,
wherein the first probe point, the second probe point, the one or more other probe points, or a combination thereof are collected from a geographic area represented by the map tile representation.

18. The non-transitory computer-readable storage medium of claim 17, wherein a zoom level of the map tile representation is selectable.

19. The non-transitory computer-readable storage medium of claim 17, wherein the first probe point, the second probe point, the one or more other probe points are collected from within a specified search radius.

20. The non-transitory computer-readable storage medium of claim 19, wherein the specified search radius is a dynamic search radius.

* * * * *